United States Patent Office 3,093,422
Patented June 11, 1963

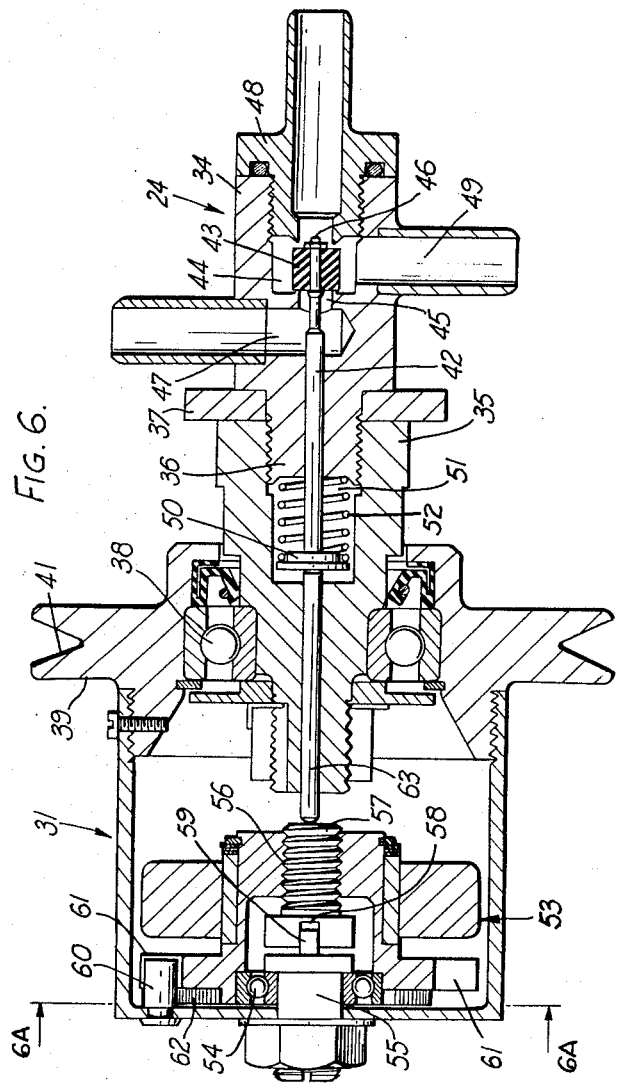

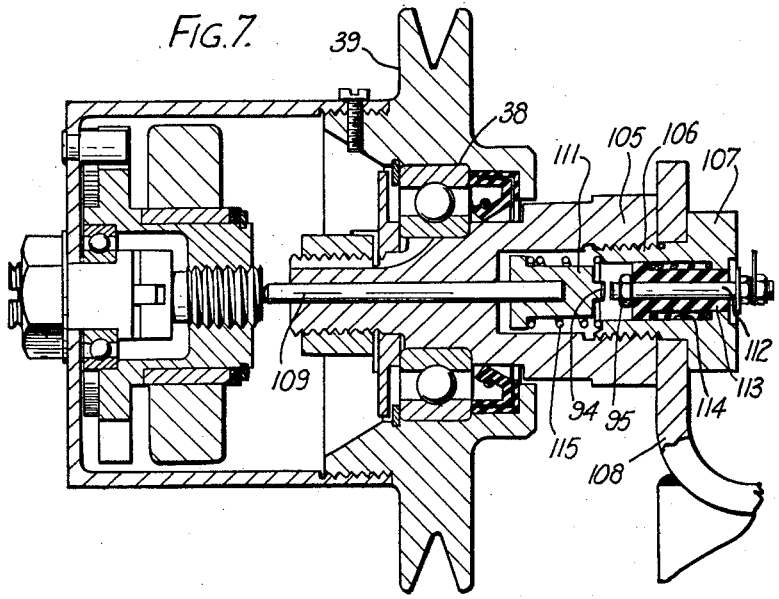
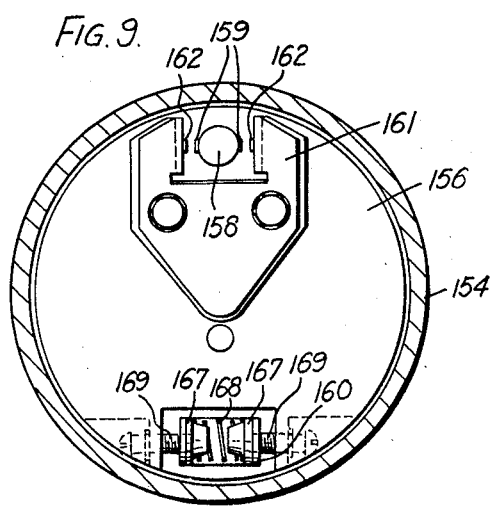

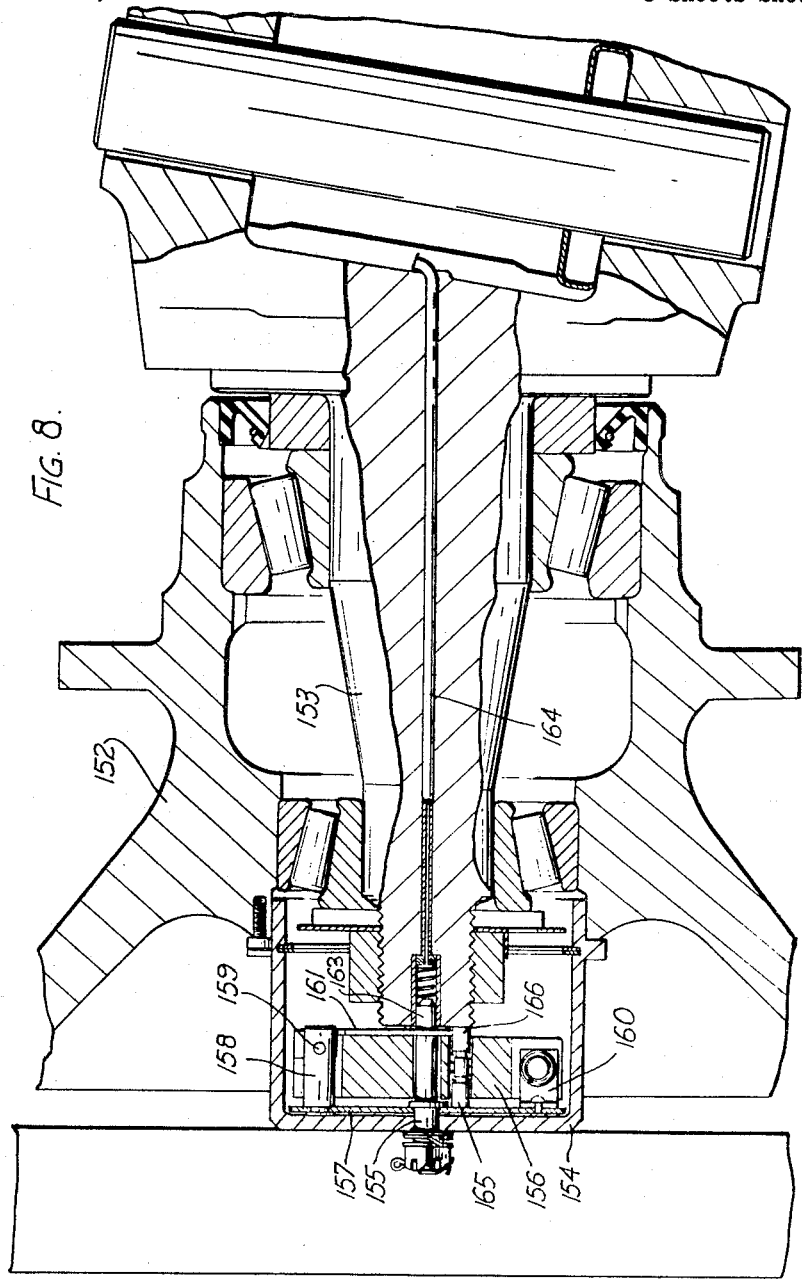

3,093,422
VEHICLE BRAKE SYSTEM
Mervyn Brian Packer, Allen Frank Prestidge, John Rodway, and Frank Gordon Parnell, all of Leamington Spa, England, assignors to Automotive Products Company Limited, Leamington Spa, England
Filed Mar. 2, 1960, Ser. No. 12,295
Claims priority, application Great Britain Mar. 16, 1959
1 Claim. (Cl. 303—21)

This invention relates to liquid pressure braking systems for vehicles of the type, hereinafter called the hydrostatic type, in which liquid pressure generated in a master cylinder is transmitted to motor cylinders acting on the shoes or pads of the brakes to urge them against rotating drums or discs.

The object of the present invention is to provide, in a braking system of the hydrostatic type, means whereby the brake applying pressure acting on any one brake or group of brakes is reduced automatically if the deceleration of the wheel, or of one or more wheels of the group, exceeds a predetermined value, thereby preventing locking and skidding of the wheel or wheels.

According to the present invention, in a liquid pressure braking system of the hydrostatic type, there is provided between the master cylinder and a brake-operating motor cylinder apparatus operable by a deceleration-responsive device as a result of deceleration, exceeding a predetermined rate, of a wheel having a brake operated by said motor cylinder, said apparatus acting to isolate the motor cylinder from the master cylinder and to enlarge the total volume of the liquid space in the isolated part of the system including the motor cylinder, whereby the effective brake operating pressure is reduced without releasing liquid from the system and without reduction of the master cylinder pressure.

The said apparatus preferably comprises a valve closable to prevent flow of liquid from the master cylinder to the motor cylinder and a plunger movable to increase the volume of the liquid space in the isolated part of the system including the motor cylinder.

The plunger may have oppositely directed surfaces exposed to liquid pressure on opposite sides of the valve, the said surface on the side adjacent the motor cylinder being of larger area than the surface on the side adjacent the master cylinder.

A servo-motor is preferably provided to hold the plunger against displacement by pressure in the isolated part of the system including the motor cylinder, said servo-motor being rendered inoperative by the deceleration responsive device.

The said apparatus may comprise a housing in which is formed a bore, the plunger being slidable through sealing means in the bore between portions thereof connected respectively to the master cylinder and to the motor cylinder, one end of the said plunger being disposed in the chamber connected to the motor cylinder and the said plunger extending through the chamber connected to the master cylinder and projecting beyond the housing.

The invention is hereinafter described with reference to the accompanying drawings, in which:

FIGURE 6 is a sectional elevation of a deceleration-responsive device for use in the braking system described with reference to FIGURE 1;

FIGURE 7 is a sectional elevation of another form of deceleration-responsive device, for use in the braking system described with reference to FIGURE 3;

FIGURE 8 is a sectional elevation of another form of deceleration-responsive device usable, for example on the front wheels of the vehicle in the arrangements shown in FIGURE 3; and FIGURE 9 is a section on the line 9—9 of FIGURE 8.

Figure 1:
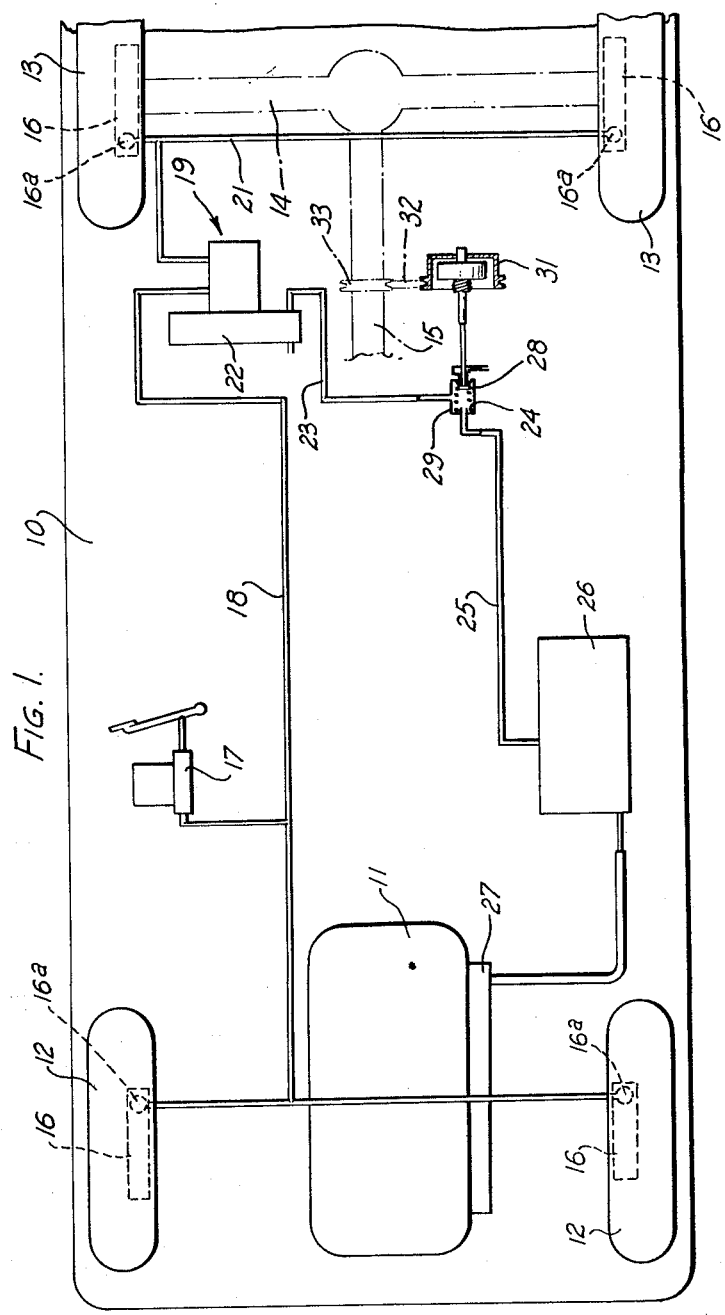
FIGURE 1 is a diagram showing one arrangement of a liquid pressure braking system according to the present invention.

Referring to FIGURE 1 of the drawings, the outline of a motor vehicle is shown at 10, the engine being indicated at 11, the front wheels at 12 and the rear wheels at 13. Part of a transmission shaft transmitting the drive from the engine 11 to the rear axle 14 on which the rear wheels are mounted is shown at 15. Each of the wheels 12 and 13 is provided with a brake 16, which may be of either the shoe or the disc type and is actuated by liquid pressure produced in a pedal-operated master cylinder 17 acting in a motor cylinder 16a. A conduit system 18 connects the master cylinder 17 directly to the motor cylinders 16a of the brakes 16 on the front wheels 12 and to an apparatus 19, which may be of the form hereinafter described with reference to either FIGURE 4 or FIGURE 5, another conduit system 21 connecting the apparatus 19 to the motor cylinders 16a of the brakes 16 on the rear wheels 13. The apparatus 19 normally provides free communication between the two conduit systems 18 and 21, so that the pressure created in the master cylinder 17 is applied equally to the brakes on both the front and the rear wheels. The apparatus 19 includes a vacuum servo-motor 22 the working chamber of which is connected by a conduit 23 to a valve 24. The valve 24 is operable to connect the said conduit 23 to the atmosphere or to another conduit 25 which is in turn connected to a vacuum reservoir 26 from which air is extracted by suction created in the induction manifold 27 of the vehicle engine 11. The valve 24 includes a closure member 28 urged by a spring 29 into the position shown in FIGURE 1, in which it holds the said closure member 28 on a seat to close the connection to atmosphere. The valve 24 is controlled by a deceleration-responsive device 31 driven by a V-belt 32 from a belt pulley 33 on the transmission shaft 15, or by other suitable means.

The valve 24 and deceleration-responsive device 31 are shown more fully in FIGURE 6. The valve 24, which is fixed in any suitable manner to the vehicle adjacent the transmission shaft 15, comprises a body formed in two parts 34 and 35 one of which has a screw-threaded projection 36 screwing into the other to clamp between the said parts a fixing bracket 37. On the part 35 is mounted a ball bearing 38 rotatably supporting a drum-like casing 39 having formed therein a V-pulley 41 to receive the V-belt 32. A rod 42 slidable in a longitudinal bore in the projection 36 carries a valve head 43 disposed in a valve chamber 44 in the part 34 of the valve body, the valve head 43 being movable between two valve seats one at each end of the chamber and surrounding respectively two ports 45 and 46. The port 45 leads into a transverse drilling 47 in the valve body part 34, which drilling is connected to the atmosphere, and the port 46 which is formed in a plug 48 closing the valve chamber 44, is connected by the conduit 25 to the vacuum reservoir 26. A third port 49 opening laterally into the valve chamber 44 is connected by the conduit 23 to the servo-motor 22.

Figure 6A:
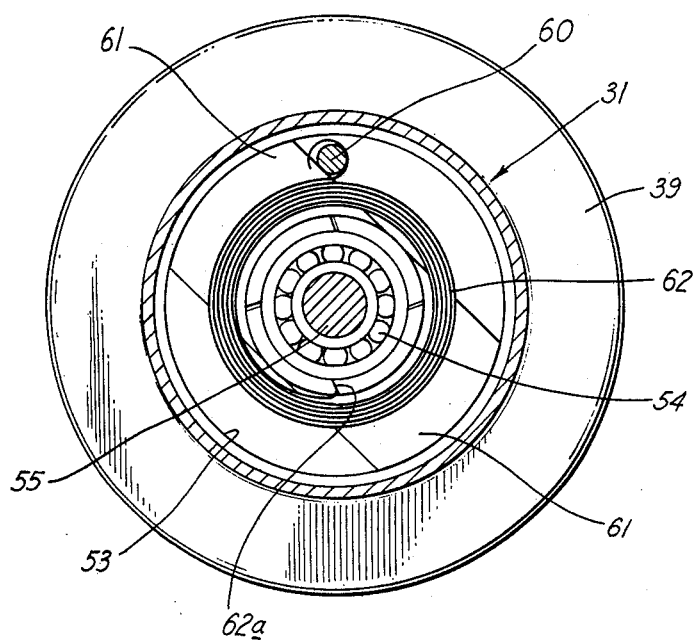
FIGURE 6A is a sectional view on a line 6A—6A of FIGURE 6.

The rod 42 extends into a cavity 51 in the valve body part 35, and carries a head 50 in that cavity on which acts a spring 52 urging the valve head 43 on to the seat around the port 45. A flywheel unit 53 is mounted on a ball bearing 54 on a stud 55 in the drum-like casing 39, the flywheel unit 53 having a screw-threaded bore 56 in which is engaged a screw-threaded stud 57 having a diametral slot 58 in one end which is engaged by a diametral key 59 in the stud 55, so that the two studs are held against relative rotation. Rotation of the flywheel unit 53 in the casing 39 is limited by a peg 60 fixed in the said casing and co-operating, as is shown in FIGURE 6A, with a pair of opposed radial arms 61 on the flywheel unit, and a spiral spring 62 anchored at one end to the flywheel unit at 62a (FIGURE 6A) and at the other end to the peg 60 urges the said flywheel unit in the direction opposite to that in which it is rotated by the transmission shaft during forward movement of the vehicle, to urge one of the arms 61 against the peg 60. A rod 63 slidable in a bore in the valve body part 35 engages at one end with the stud 57 and at the other end with the head 50 in the rod 42.

The spring 62 is so calibrated that, at a predetermined rate of deceleration of the rear wheels, the inertia of the flywheel unit 53 overcomes it, and the flywheel unit then turns relative to the casing 39, the screw thread connection between the flywheel unit and the stud 57 being such that this relative turning movement moves the stud 57 axially towards the valve body, transmitting thrust through the rods 63 and 42 to the valve head 43, which is thus moved clear of the seat around the port 45 and on to the seat around the port 46.

Figure 4:
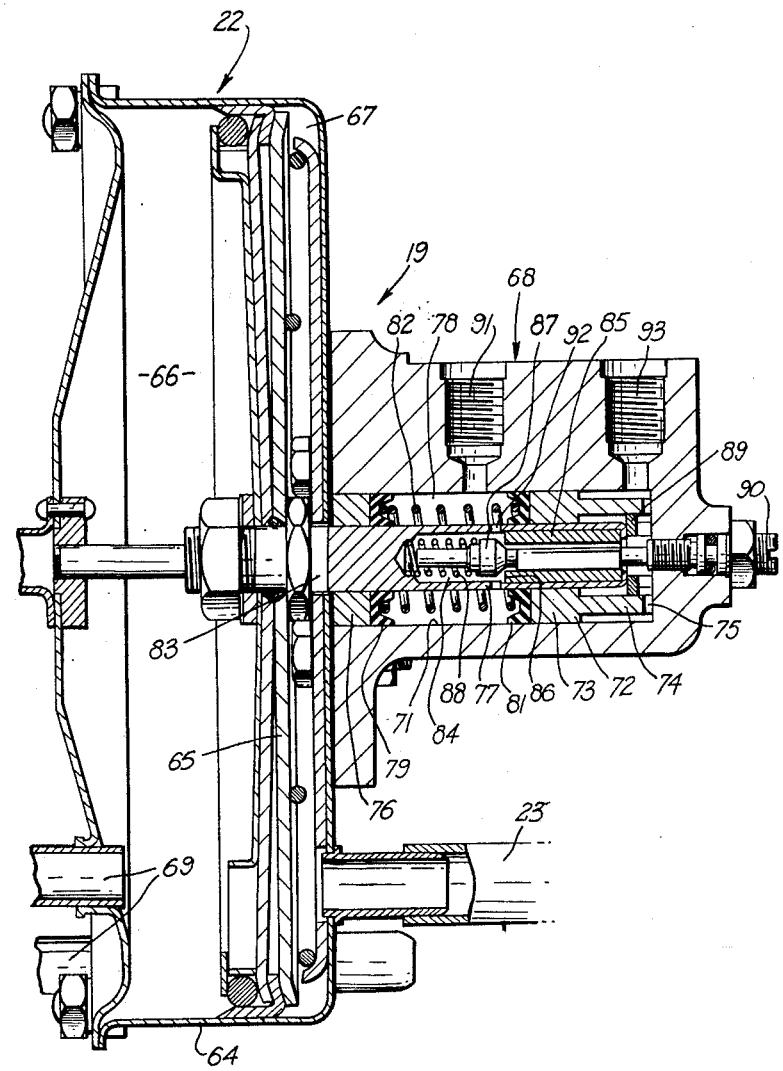
FIGURES 4 and 5 show two forms of apparatus operable by a deceleration responsive device to isolate a motor cylinder or motor cylinders of the braking system from the master cylinder thereof.

Referring now to FIGURE 4, which shows one embodiment of the apparatus 19, the servo-motor 22 comprises a cylindrical body 64 in which is slidably mounted a piston 65 dividing the interior of the said body into two chambers 66 and 67. A valve body 68 is secured coaxially to the end wall of the servo-motor body 64 defining one end of the chamber 67, and that chamber is connected by the conduit 23 to the valve 24. The other chamber 66 of the servo-motor is open to the atmosphere through a conduit 69 having an air filter at its open end.

The valve body 68 has formed in it a cylindrical bore 71 which is closed at one end. A sleeve member 72 is mounted in the closed end of the bore 71 the sleeve member 72 having a portion 73 which fits closely in the bore 71, and a thinner portion 74 formed by cutting away both its external and internal surfaces, the thinner portion 74, which abuts against the closed end of the bore 71, being notched at its end, as shown at 75, to provide communication between the internal bore of the sleeve member and the annular space about its thinner portion. A collar 76 having the same internal diameter as the portion 73 of the sleeve member 72 fits in the open end of the bore 71, being retained therein by the end wall of the servo-motor body, and a plunger 77 is slidably mounted in the collar and sleeve member so as to extend across a chamber 78 defined between them. Annular lipped packings 79, 81 urged against the end surfaces of the collar and sleeve member by a spring 82 in the chamber 78 provide a fluid-tight seal between the said collar and sleeve member, and the wall of the bore 71, and also between the said collar and sleeve member and the surface of the plunger 77. The plunger 77 is engaged at its end which passes through the collar 76 by a stud 83 on the piston 65 of the servo-motor, and when suction acts in the chamber 67 of the servo-motor, the atmospheric pressure in the chamber 66 thereof causes the plunger 77 to be urged towards the closed end of the valve bore 71. A cavity 84 is formed in the plunger, extending axially thereinto from the end of the plunger adjacent the closed end of the valve bore 71, and a sleeve 85, retained in the said cavity by turning inwardly the end of the annular wall enclosing the cavity provides at its inner end a valve seat 86 for a valve member 87 guided by means of a non-circular stem sliding in the sleeve 85 and urged towards the seat 86 by a spring 88 in the cavity 84. An annular stop member 89 limits travel of the plunger 77 towards the closed end of the valve bore 71, and an adjustable stop pin 90 engaged in a screw-threaded hole in the closed end of the valve bore 71 limits the travel of the valve member 87 to such an extent that, when the plunger 77 is in engagement with the stop member 89, the valve member 87 is held off its seat.

A passage 91 in the valve body 68 leads into the chamber 78 which is connected by ports 92 in the plunger 77 to the cavity 84, and a second passage 93 in the valve body leads into the annular space around the thinner portion 74 of the sleeve member 72. The passage 91 is connected by the conduit 18 to the master cylinder, and the passage 93 is connected by the conduit 21 to the rear brakes of the vehicle.

During normal movement of the vehicle, the valve member 43 of valve 24 is held on the seat surrounding the port 45 by the spring 52, and the chamber 67 of the servo-motor 22 is therefore connected to suction, with the result that the plunger 77 is held against the stop member 89 and the valve member 87 is held off its seat. Pressure created in the master cylinder 17 to operate the brakes is therefore transmitted to the motor cylinders 16a of both the front and rear brakes. If however, the brakes are applied with sufficient force to produce a rate of deceleration of a wheel or wheels of the vehicle such that the inertia of the flywheel unit 53 rotating therewith overcomes the spring 62, the flywheel unit turns on the stud 55, and the stud 57 is moved axially to displace the valve member 43 on to the seat around the port 46. The chamber 67 of the servo-motor 22 is thus connected to the atmosphere, removing the thrust exerted by the servo-motor piston 65 on the plunger 77. Since the plunger 77 is acted on by the liquid pressure in the braking system only at its end adjacent the closed end of the valve bore 71, this liquid pressure tends to displace the said plunger away from the closed end of the valve bore. After a short movement, the valve member 87 seats, isolating the rear brakes from the master cylinder, and the plunger 77 continues to move until the pressure acting on the rear brakes falls substantially to the pressure of the surrounding atmosphere. The application of the brakes to the rear wheels is therefore relieved, and the risk of sliding of those wheels is removed. As soon as the rate of deceleration of the wheel or wheels decreases sufficiently for the spring 62 to return the flywheel unit to its normal position, the chamber 67 of the servo-motor is again subjected to suction and the plunger 77 is moved to re-open the connection between the master cylinder and the rear brakes, so that those brakes are again applied.

Figure 2:
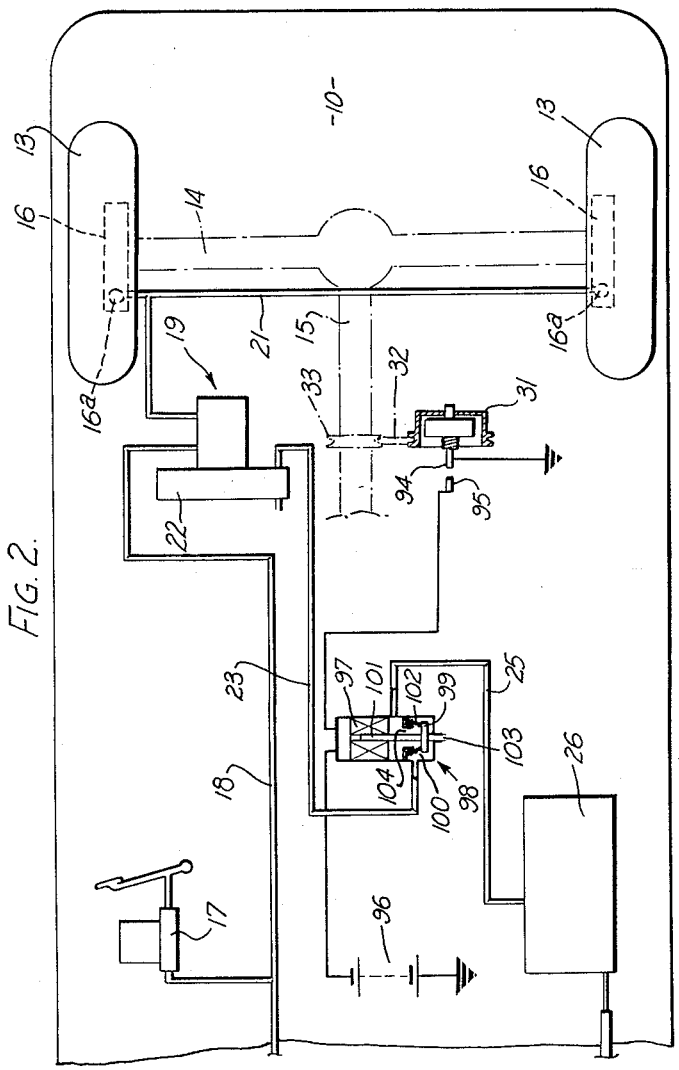
FIGURES 2 and 3 are diagrams showing other arrangements of liquid pressure braking systems according to the present invention.

Referring now to FIGURE 2 of the drawings, in which corresponding parts are indicated by the same reference numerals as are used in FIGURE 1, the deceleration responsive device 31 is arranged to actuate contacts 94, 95 in an electrical circuit including a battery 96 and a solenoid 97 arranged to actuate a valve 98 which functions in the same manner as the valve shown in FIGURE 6. The valve is shown diagrammatically in FIGURE 2, and comprises a head 99 in a chamber 100, the head 99 being mounted on the armature 101 of the solenoid 97, the head 99 being urged by a spring 102 on to a seat around a port 103 leading to the atmosphere, and being urged, when the solenoid is energised, on to a seat surrounding a port 104 connected by the conduit 25 to the vacuum reservoir 26. The conduit 23 leading to the servo-motor is connected to the chamber 100.

The deceleration responsive device 31 is shown in FIGURE 7, together with the contacts operated thereby, the deceleration responsive device being identical with that shown in FIGURE 6. The ball bearing 38 on which the drum-like casing 39 of the deceleration responsive device is mounted is supported on a tubular fitting 105 having an axial recess at its outer end closed by a screwed plug 106 having a head 107. A bracket 108 for supporting the device is clamped between the outer end of the fitting 105 and the head 107. A rod 109, corresponding to the rod 63 in FIGURE 7, carries, in the recess in the tubular fitting, a head 111 on which is mounted the contact 94, the contact 95 being mounted on the end of an electrically conductive rod 112 fitted in an insulating bush 113 located in a bore 114 in the screwed plug 106. The contact 94 is earthed through the fitting 105 and bracket 108 to the vehicle chassis. The head 111 is urged in a direction to separate the contacts 94, 95 by a spring 115. The flywheel unit 53 acts in the manner described with reference to FIGURE 7 to close the contacts 94, 95 when a predetermined rate of deceleration of the wheel or wheels with which it rotates is exceeded, so that the rear brakes are isolated from the master cylinder and the pressure acting in them is reduced, as already described.

Figure 3:
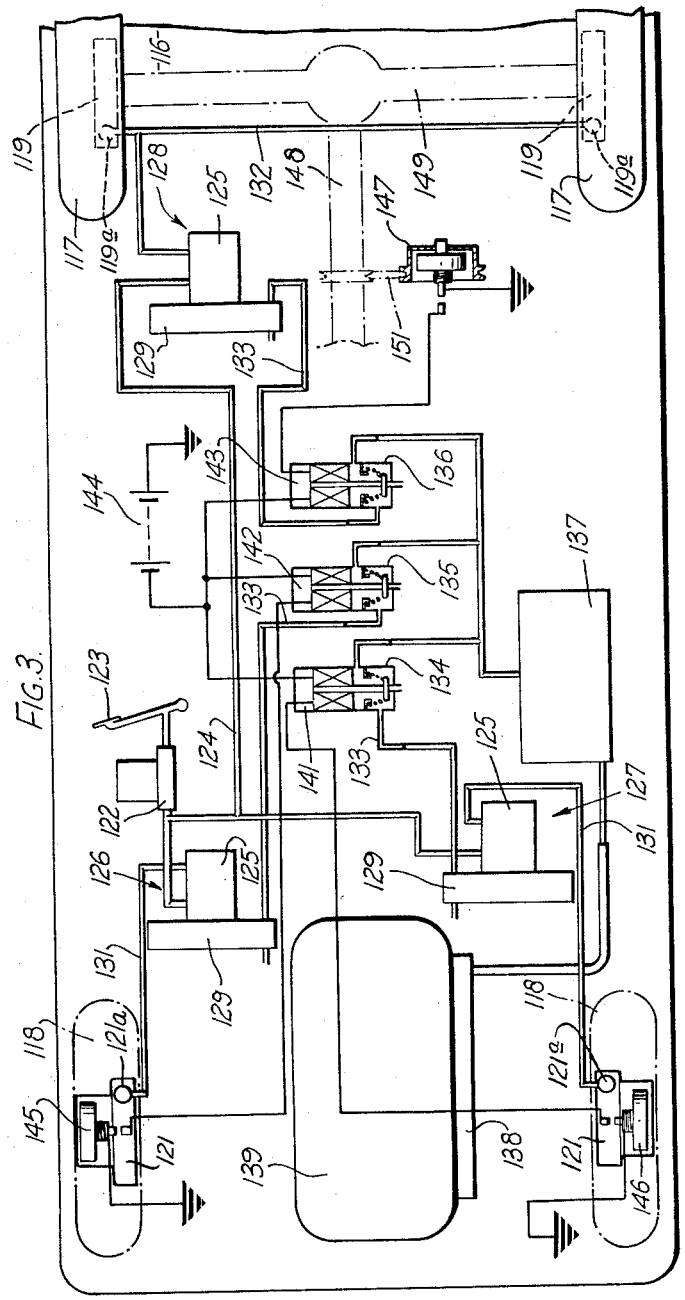

FIGURE 3 shows a braking system according to the invention in which means are provided for relieving the braking pressure on the front wheels in the event of their deceleration exceeding a predetermined limit, as well as similar means associated with the rear brakes, each front wheel being associated with an independent deceleration-responsive unit driven by that wheel. The outline of the vehicle is indicated at 116, the rear wheels are shown at 117, and the front wheels at 118. Each rear wheel is provided with a brake 119 operated by a motor cylinder 119a and each front wheel is provided with a brake 121 operated by a motor cylinder 121a. A master cylinder 122, operated for example by a pedal 123, is connected by a conduit system 124 to three valve devices 125 each constituting a part of one of three sets of apparatus 126, 127 and 128. Each of these sets of apparatus includes a servo-motor 129 operating one of the valve devices 125, which may be as already described with reference to FIGURE 4 of the drawings, or as will be described hereinafter with reference to FIGURE 5. The valve devices 125 of the sets of apparatus 126 and 127 are connected by conduits 131 to the front brake motor cylinders 121a, and the valve device 125 of the set of apparatus 128 is connected by a conduit system 132 to the rear brake motor cylinders 119a.

The three servo-motors 129 of the sets of apparatus 126, 127 and 128 have their working chambers connected respectively by conduits 133 to three valves 134, 135 and 136 which are in turn connected to a vacuum reservoir 137 in which reduced pressure is maintained by suction in the inlet manifold 138 of the vehicle engine 139. The valves 134, 135 and 136 are of the same construction as the valve 98 shown in FIGURE 2, each valve being controlled by one of three solenoids 141, 142 and 143. The three solenoids are arranged in three parallel electrical circuits all including a common battery 144 and each also including a separate pair of contacts controlled by a deceleration responsive device. The deceleration responsive devices 145 and 146 which control the contacts associated with the solenoids 141 and 142 controlling the valves 134 and 135 are mounted one on each of the front wheels 118 of the vehicle, and the deceleration responsive device 147 which controls the contacts associated with the solenoid 143 controlling the valve 136 is mounted adjacent a transmission shaft 148 driving the rear axle 149 of the vehicle and is driven from the said transmission shaft by a V-belt 151.

The deceleration responsive devices 145 and 146 are of the form shown in FIGURES 8 and 9. In FIGURE 8, the hub of a front wheel 118 is shown at 152, and a stub axle on which the wheel is mounted is shown at 153. A drum-like casing 154 mounted co-axially on the hub 152 has co-axially fixed therein a stud 155 on which is freely mounted a flywheel unit 156. The flywheel unit 156 is notched at two diametrically opposite points, and a plate 157 clamped by a shoulder on the stud 155 in a position adjacent the end wall of the casing 154 carries a pin 158 projecting into one of the notches, and a U-shaped bracket 160 projecting into the other. The pin 158 carries, at diametrically opposite positions thereon, two contacts 159 and a plate 161, mounted on but insulated from the flywheel unit, carries a pair of co-operating contacts 162. The plate 161 is engaged by a carbon brush 163 mounted in an insulating mounting in the end of the stub axle 153 and connected by an insulated conductor 164 to the solenoid 141 or 142. A pair of additional carbon brushes 165 and 166 mounted in an eccentric hole in the flywheel unit 156 are spring-pressed against the plate 157 and against the end of the stub-axle 153 respectively to ensure that the pin 158 is adequately earthed to the vehicle structure.

Between the arms of the U-shaped bracket 160 are mounted two discs 167, urged against the said arms by a spring 168 acting between them, and screw abutments 169 mounted in the flywheel unit project through holes in the bracket arms to engage the said discs, so that by suitable adjustment of the said screw abutments 169 the flywheel unit 156 is set to a position in which the contacts 159 on the pin 158 are equally spaced from the contacts 162 on the plate 161. The spring 168 has a strength such that it yields to allow the flywheel unit to turn on the stud 155 when a predetermined rate of deceleration of the wheel or wheels is exceeded, so as to close one pair of contacts 159, 162.

Excessive deceleration of either front wheel of the vehicle causes the appropriate deceleration responsive device 145 or 146 to close contacts in the electrical circuit of the solenoid 141 or 142, thus operating the apparatus 126 or 127 to reduce the braking pressure on that front wheel until the rate of deceleration has fallen below the predetermined value. Similarly, excessive deceleration of the rear wheels results in operation of the apparatus 128 as already described to reduce the braking pressure on the rear wheels, so that skidding of all the wheels of the vehicle is prevented, and the degree of braking, when the brakes are strongly applied, fluctuates about a mean value, slightly below that at which adhesion of the tyres on the road would be lost, thus making the greatest possible use of such adhesion.

It will be understood that, if desired, each of the rear wheel brakes may be separately controlled in the same manner as the front wheel brakes, so that each wheel of the vehicle has the degree of braking thereon limited by its own rate of deceleration.

Figure 5:
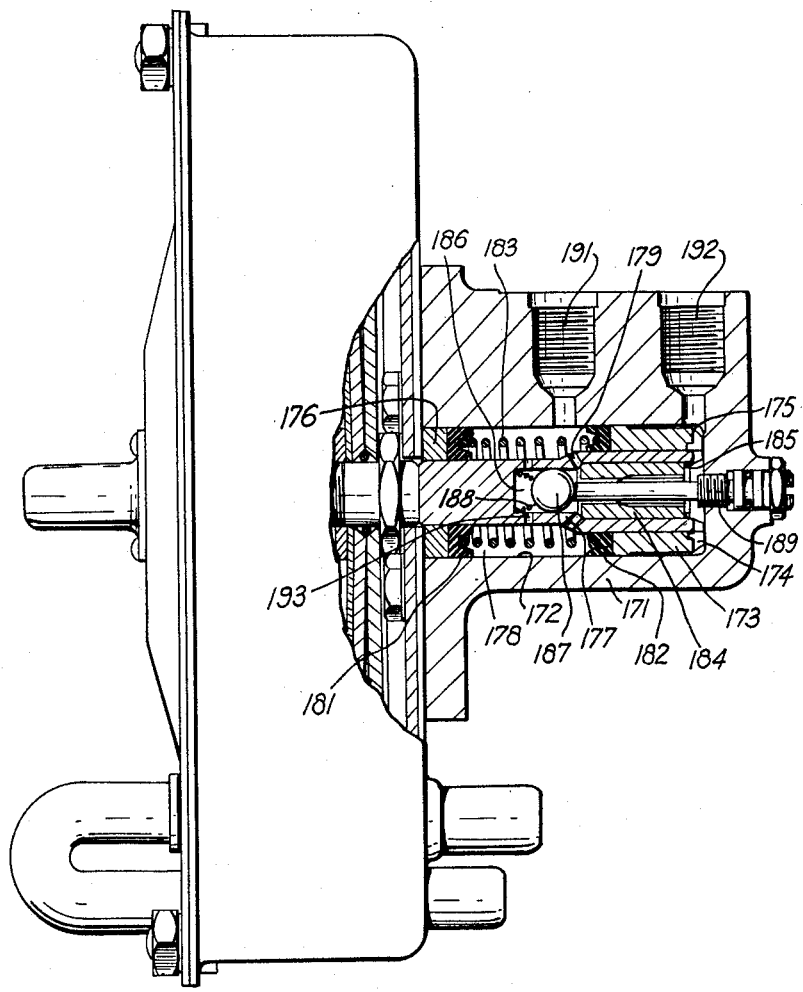

FIGURE 5 of the drawings shows a modified form of servo-motor operated valve device which may be used in any of the braking systems described with reference to FIGURES 1, 2 and 3, in place of the valve device shown in FIGURE 4. The servo-motor which operates this valve device may be identical with that shown in FIGURE 4, and has been omitted from FIGURE 5.

The valve device shown in FIGURE 5 comprises a body 171 having therein a cylindrical bore 172 closed at one end and open at its other end, which abuts against an end wall of the servo-motor casing. Adjacent its closed end, the bore has fitted in it a sleeve 173 notched at its end which abuts the closed end of the bore 172, as shown at 174, to provide communication between the interior of the said sleeve and an annular space 175 formed around it by relieving its outer surface. A collar 176 having a somewhat smaller internal diameter than the sleeve 173 fits in the open end of the bore 172, and a plunger 177 extending across the chamber 178 defined in the said bore between the sleeve and the plunger is stepped at 179 so that it is a sliding fit in both the sleeve and the collar. Annular lipped packing washers 181 and 182, held against the end surfaces of the collar 176 and the sleeve 173 by a spring 183 provide fluid-tight sealing of the chamber 178.

The plunger 177 has a co-axial bore extending from its end nearest to the closed end of the bore 172, and a bush 184 is retained in the open end of the plunger bore by a resilient ring 185, leaving a cavity 186 in the said plunger in which is mounted a ball valve 187 urged to seat on the inner end of the bush 184 by a spring 188. An adjustable stop pin 189 mounted in the closed end of the bore 172 co-operates with the ball valve 187 to unseat it when the plunger abuts against the closed end of the bore, the end of the plunger 177 being notched to enable liquid to pass from the bore thereof into the annular space 175 when the said end of the plunger is in contact with the end of the bore 172.

Passages 191 and 192 in the valve body 171 open respectively into the chamber 178 and into the annular space 175 and are connected to the master cylinder and to the brake in which the pressure is to be controlled respectively. Ports 193 in the plunger 177 connect the chamber 178 to the cavity 186.

During normal operation of the vehicle, when the servo-motor working chamber is connected to the vacuum reservoir as has already been described, the plunger 177 is held by the servo-motor piston in engagement with the end wall of the bore 172, and the brake is freely connected to the master cylinder, so that the master cylinder pressure is operative to apply the brake. When the servo-motor is de-energized by operation of the solenoid-operated valve the plunger 177 is free to move away from the closed end of the bore 172, so that the ball valve 187 closes. At the moment when the ball valve closes the pressures in the chamber 178 and in the annular space 175 are equal so that, owing to the fact that the area of the end of the plunger exposed to the pressure in the space 175 is greater than the area of the step on the plunger which is exposed to the pressure in the chamber 178, the plunger continues to move until the pressure in the annular space which is also acting on the brake, drops to a value at which the opposing thrusts on the plunger balance one another. The pressure acting on the brake therefore drops to reduce the deceleration of the wheel, but is not completely lost, the proportion of the reduced pressure to the master cylinder pressure depending on the relative areas of the larger end of the plunger and the step thereon. This smaller drop in pressure, whilst being equally effective to prevent skidding, reduces the time lag before the full braking pressure is restored, and therefore provides a higher average pressure in the brakes during a powerful braking operation, and quicker stopping of the vehicle.

We claim:

A liquid pressure braking system of the hydrostatic type wherein there is provided between the master cylinder and a brake operating motor cylinder with a brake operated by said motor cylinder, apparatus operable by a deceleration responsive device as a result of deceleration exceeding a predetermined rate of a wheel, said apparatus acting to isolate the motor cylinder from the master cylinder and to enlarge the total volume of the liquid space in the isolated part of the system including the motor cylinder, whereby the effective braking pressure is reduced without releasing liquid from the system and without reduction of the master cylinder pressure, said apparatus including a hollow housing having a port therein in communication with said master cylinder and a port therein in communication with said motor cylinder, said ports being spaced from each other, a slidable plunger disposed in said housing of substantially smaller diameter than said housing forming an annular chamber around said plunger, axial bore means in said plunger, a sleeve disposed in said bore means forming a valve seat at one end, first port means in said plunger in communication with said annular chamber and said master cylinder port, said sleeve forming a passage communicating with said first port means and said motor cylinder port, a valve enclosed within the axial bore means of said plunger adjacent the master cylinder port adapted to seat on said sleeve valve seat to close off communication between said master cylinder and motor cylinder, resilient means mounting said valve within said bore means to provide relative movement thereof with respect to said plunger, said valve being normally open when said slidable plunger is disposed toward the end of the housing adjacent said motor cylinder port to permit communication between the master and motor ports through the annular chamber, plunger and axial bore means, and said valve being closed and seated on said valve seat when said slidable plunger is disposed toward the end of the housing adjacent said master cylinder port to cut off communication between said master and motor cylinder ports, an annular stop member limiting the travel of the plunger toward said motor cylinder port, an adjustable stop pin member maintaining said valve unseated when said plunger bears on its annular stop member, and an annular sleeve member surrounding said plunger and disposed in said housing toward the end thereof adjacent said motor port and forming sealing means therein, said annular sleeve member having recesses therein communicating with said axial bore means and said motor port, said plunger having a solid portion adjacent the end thereof by said master port so that when said valve is seated liquid entering said axial bore will tend to move said plunger toward the end of the housing adjacent said master port to increase the volume of said isolated part of said system.

References Cited in the file of this patent

UNITED STATES PATENTS

| | | |
|---|---|---|
| 2,406,284 | Fitch | Aug. 20, 1946 |
| 2,514,458 | Sinz | July 11, 1950 |
| 2,753,017 | Curl et al. | July 3, 1956 |
| 2,759,571 | Carlson | Aug. 21, 1956 |
| 2,826,278 | Highley | Mar. 11, 1958 |
| 2,868,338 | Lucien et al. | Jan. 13, 1959 |
| 2,991,797 | Baldwin | July 11, 1961 |